US008036891B2

(12) United States Patent
Fulop

(10) Patent No.: US 8,036,891 B2
(45) Date of Patent: Oct. 11, 2011

(54) METHODS OF IDENTIFICATION USING VOICE SOUND ANALYSIS

(75) Inventor: Sean Fulop, Fresno, CA (US)

(73) Assignee: California State University, Fresno, Fresno, CA (US)

( * ) Notice: Subject to any disclaimer, the term of this patent is extended or adjusted under 35 U.S.C. 154(b) by 776 days.

(21) Appl. No.: 12/146,971

(22) Filed: Jun. 26, 2008

(65) Prior Publication Data
US 2009/0326942 A1 Dec. 31, 2009

(51) Int. Cl.
*G10L 17/00* (2006.01)
(52) U.S. Cl. .................. 704/246; 704/203; 704/206
(58) Field of Classification Search .................. 704/200, 704/203, 204, 205, 206, 246, 278
See application file for complete search history.

(56) References Cited

U.S. PATENT DOCUMENTS

| 4,081,607 | A | | 3/1978 | Vitols et al. |
| 4,415,767 | A | | 11/1983 | Gill et al. |
| 4,477,925 | A | | 10/1984 | Avery et al. |
| 4,729,128 | A | | 3/1988 | Grimes et al. |
| 5,271,088 | A | | 12/1993 | Bahler |
| 5,414,755 | A | | 5/1995 | Bahler et al. |
| 5,749,073 | A | * | 5/1998 | Slaney ................. 704/278 |
| 7,120,582 | B1 | | 10/2006 | Young et al. |
| 2003/0033094 | A1 | | 2/2003 | Huang |

OTHER PUBLICATIONS

"Speaker Recognition, ECE 576 Final Project", Jordan Crittenden and Parker Evans, retrieved on Feb. 25, 2009 at http://instruct1.cit.cornell.edu/courses/ece576/FinalProjects/f2008/pae26_jsc59/pae26_jsc59/index.html.
Kersta, L.G., "Voiceprint Identification," Nature (2002), 196: 1253-1257, Bell Telephone Labs, Inc., Murray Hill, NJ.
Bolt, Richard H., et al, "Speaker Identification by Speech Spectrograms: A Scientists' View of its Reliability for Legal Purposes," Journal of the Acoustical . . . Society of America (1970), 47(2): 597-612, Research Laboratory of Electronics, MIT, Cambridge, MA.
Bolt, Richard H., et al, "Speaker Identification by Speech Spectrograms: Some Further Observations" J. Acoust. Soc. Am. (1973), 54(2) 531-534.
Black, John W., et al, "Reply to 'Speaker Identification by Speech Spectrograms: Some Further Observations'" J. Acoust. Soc. Am. (1973), 54(2) 535-537.
Kodera, K., et al, "A New Method for the Numerical Analysis of Non-stationary Signals," Phys Earth and Planetary Interiors (1976) 12:142-150.
Kodera, K., et al, "Analysis of Time-varying Signals with Small BT Values" IEEE Transactions Acoustic, Speech, and Signal Processing (1978) ASSP-26(1): 64-7.
Koenig, Bruce E., "Spectrographic Voice Identification: A Forensic Survey," J. Acoust, Soc. Am. (Jun. 1986), 79(6): 2088-2090.
Auger, Francois, et al, "Improving the Readability of Time-Frequency and Time-Scale Representations by the Reassignment Method," IEEE Transactions . . . on Signal Process (May 1995)43(5): 1068-1089.

(Continued)

*Primary Examiner* — Huyen X. Vo
(74) *Attorney, Agent, or Firm* — Mark D. Miller; Marcus DiBuduo

(57) ABSTRACT

Methods of using individually distinctive patterns of voice characteristics to identify a speaker include computing the reassigned spectrogram of each of at least two voice samples, pruning each reassigned spectrogram to remove noise and other computational artifacts, and comparing (either visually or with the aid of a processor) the strongest points to determine whether the voice samples belong to the same speaker.

53 Claims, 5 Drawing Sheets

OTHER PUBLICATIONS

Plante, F., et al, "Improvement of Speech Spectrogram Accuracy by the Method of Reassignment," IEEE Transactions on Speech and Audio Processing (May 1998), 6(3): 282-286.

Fitz, Kelly R., "The Reassigned Bandwidth-enhanced Method of Additive Synthesis" (1999), Doctorial Thesis at University of Illinois at Urbana-Champaign.

Plumpe, Michael D., et al, "Modeling of the Glottal Flow Derivative Waveform with Application to Speaker Identification," IEEE Transactions . . . on Speech and Audio Processing (1999), 7(5): 569-585.

Nelson, D. J., "Cross-spectral Methods for Processing Speech," J. Acoust. Soc. Am. (2001), 110(5): 2575-2592.

Nelson, D. J., "Instantaneous Higher Order Phase Derivatives," Digital Signal Processing, (2002) 12: 416-428.

Hollien, Harry, "Voiceprints," Forensic Voice Identification (2002), Ch. 6, 115-135.

Rose, Phillip, "Characteristic forensic speaker identification," Forsnsic Speaker Identification, (2002), 106-123.

Fulop, Sean, "Cheating Heisenberg: Achieving certainty in wideband spectrography," J. Acoust. Soc. Am. (2003), 114: 2396-2397.

Fulop, S.A., et al, "Yeyi clicks: Acoustic description and analysis," Phonetica (2003), 60: 231-260.

Feng, Ling, "Speaker Recognition" (Sep. 2004), Masters Thesis at Technical University of Denmark.

Fulop, Sean A., "A Brief Research Summary" (Oct. 2004).

Fitz, Kelly, et al, "A Unified Theory of Time-Frequency Reassignment," Digital Signal Processing (Sep. 2005).

Fulop, Sean A., et al, "Algorithms for Computing the Time-Corrected Instantaneous Frequency (Reassigned) Spectrogram, with Applications," . . . J. Acous. Soc. Am., (Jan. 2006), 119(1): 360-371.

Murty, K. Sri Rama, et al "Combining Evidence from Residual Phase and MFCC Features for Speaker Recognition," IEEE Signal Processing Letters, (Jan. 2006), 13(1): 52-55.

Fulop, Sean A., et al, "Using the reassigned spectrogram to obtain a voiceprint," J. Acous. Soc. Am., (May 2006), 119(5): 3337.

Fulop, Sean A., et al, "A Spectrogram for the Twenty-first Century," Acoustics Today (Jul. 2006), 2(3): 26-33.

Fulop, Sean A., "Voiceprinting (no, really)" (Aug. 2006).

Fulop, Sean A., et al, "Separation of components from impulses in reassigned spectrograms," J. Acous. Soc. Am. (Mar. 2007) 121(3): 1510-1518.

Fulop, Sean A., et al, "The The reassigned spectrogram as a tool for voice identification," International Congress of Phonetic Sciences (Jul. 2007).

Vassilakis, Pantelis N., "SRA: A Web-Based Research Tool for Spectral and Roughness Analysis of Sound Signals," 4th Sound and Music Computing Conference, (Jul. 2007).

Fitz, Kelly, et al, "On the Use of Time-frequency Reassignment in Additive Sound Modeling," J. Audio Eng. Soc., (Nov. 2002), 50(11): 879-893.

Fulop, Sean A., "Phonetic Applications of fhe Time-Corrected Instantaneous Frequency Spectrogram," Phonetica, (Accepted: Sep. 20, 2007; . . . Published online: Apr. 17, 2008), 64:237-262.

Fulop, Sean A., "Open match task" (Mar. 2006), 2 pp.

Hollien, Harry, "Pecluiar case of 'voiceprints'," J. Acoust. Soc. Am. (Jul. 1974), 56(1): 210-213.

Quatieri, Thomas F., "Speaker Recognition," Discrete-Time Speech Signal Processing, Prinicples and Practice, (2002), Ch. 14, 709-767.

Fitz, Kelly, et al, "Cell-Utes and Flutter-Tongued Cats: Sound Morphing Using Loris and the Reassigned Bandwidth Enhanced Model," Computer Music Journal, (2003) 27(3)44-65.

\* cited by examiner

Repeated utterance

Speaker 1

Speaker 2

Speaker 3

Time (ms)

METHODS OF IDENTIFICATION USING VOICE SOUND ANALYSIS

FIELD OF THE INVENTION

The present invention generally relates to methods of identifying a speaker based on individually distinctive patterns of voice characteristics. More specifically, embodiments of the present invention pertain to methods of using the reassigned spectrogram of a spoken utterance during several phonation cycles of a resonant sound, and methods of comparing two voice sounds to determine whether they came from the same source.

DISCUSSION OF THE BACKGROUND

Conventional spectrograms have, for decades, been employed in the forensic context as a means of inferring the identity of a speaker. However, aspects of the aural-spectrographic method have been challenged by a number of speech scientists; early reports of 99% accuracy in identifying speakers from just four words have not been replicated; and an early report commissioned by the F.B.I. in 1979 warned that the assumption of interspeaker variability exceeding intraspeaker variability was not adequately supported by scientific theory and data. As a result, use of conventional spectrograms for voice identification have not received general approval for use in court proceedings.

The reassigned spectrogram, a lesser-known method of imaging the time-frequency spectral information contained in a signal, offers some distinct advantages over the conventional spectrogram. Reassigned spectrograms are able to show the instantaneous frequencies of signal components as well as the occurrence of impulses with increased precision compared to conventional spectrograms (i.e. the magnitude of the short-time Fourier transform (STFT) or other calculated transform). Computed from the partial phase derivatives (with respect to time and frequency) of the transform, such spectrograms are here shown to reveal unique features of an individual's phonatory process by "zooming in" on a few glottal pulsations during a vowel. These images can thus highlight the individuating information in the signal and exclude most distracting information. To date, no attempt has been made to apply this newer technology to the problems of speaker identification or verification.

One writer in 1970 envisioned "a device with a display emphasizing those sound features that are most dependent on the speaker. The patterns could then be judged with greater confidence by human experts." No such device has since been developed or discussed before the one discussed herein. Another author discussed movies of vocal fold vibration which "show large variations in the movement of the vocal folds from one individual to another." It is precisely these individual differences that are at the root of the methods set forth herein.

Speaker identification and verification may be divided into two fundamentally different approaches. The earliest approach was initially christened "voiceprinting" (Kersta 1962), but has been subsumed under the rubric of the "aural-spectrographic method" (e.g. Rose 2002). The voiceprinting technique attempted to use spectrograms of words or longer utterances to identify a person by the overall appearance of the spectrogram. The method has recently suffered withering criticism from the vast majority of credible experts. Major points against the procedure that have been singled out are: (i) no self-described voiceprinting expert was ever able to adequately state or outline the specific criteria that were used to declare a match between a pair of spectrographic voiceprints; (ii) spectrograms of words show too much linguistic information (which is largely the same across different speakers), and not enough known individuating information; (iii) because there is no articulated theory of how to match such voiceprints, the procedure is inextricably tied to the human expert, and could never be automated by any conceivable procedure. In the end, Rose (2002) went so far as to claim that there is no way for a voiceprinting procedure to work even in principle, because no one has demonstrated that a person's voice provides a single individuating biometric image—analogous to a fingerprint—by any known computational procedure.

A more recent approach to speaker identification and verification was developed by leveraging the statistical sound-matching techniques that were originally developed for automatic speech recognition. In this approach, continuous speech is analyzed frame by frame (with each one about 25 ms in length), but a spectrogram was never utilized. Instead, a cepstrum was computed for each frame, yielding a relatively small number (on the order of 24) values called cepstral coefficients. A sophisticated statistical model, known as a Gaussian mixture model, is then computed from the frames by techniques now standard in the art (Quatieri 2002). To apply the technique to speaker identification, a Gaussian model is computed for each speaker in the database. Statistical comparison techniques are then applied to new speech in order to determine if there is a probable matching speaker in the database. Recent improvements to the technology employ a modified cepstrum known as the mel-frequency cepstrum which adheres to the human auditory frequency analysis scale.

The Gaussian modeling approach to speaker identification using mel-frequency cepstral coefficients is in many ways everything that the voiceprinting process was not. It is completely specified and algorithmically defined. It is a completely automatic procedure requiring no human intervention (and indeed, provides no opportunity for human interpretation of the results). The process does not compute anything analogous to a voiceprint—a complete statistical model of the speaker's speech is developed instead. Images are not compared. The process is also reasonably successful, with near 100% accuracy on small speaker populations recorded under excellent conditions. Its accuracy breaks down considerably under more realistic acoustics, however, and generally it has proven impossible to achieve equal error rates (equal false positive and false negative matches) of less than 10% under such "normal" conditions.

The Gaussian mixture modeling of speakers using mel-frequency cepstral coefficients appears to represent the current state-of-the-art in speaker identification. Efforts to improve the procedure have made some incremental improvements to the baseline, but the whole paradigm appears to have reached a performance ceiling below that which is acceptable for most identification and verification purposes such as forensic analysis or secured access control. As promising as the Gaussian approach may be, something completely different is called for to augment this procedure at the very least (and perhaps replace it entirely under appropriate circumstances).

One proposal for closing the performance gap involves somehow extracting information about the "fine structure" of the phonation cycle (Plumpe et al. 1999) to augment the broad Gaussian speaker model obtained from the longer utterances. In this approach, some promising speaker identification results were obtained by simply computing the glottal flow derivative and submitting it to automatic classification. However, no spectral analysis was performed at this short time resolution.

It is therefore desirable to provide voice identification and verification methods that provide a high degree of accuracy (minimal false positive and minimal false negative matches) under normal acoustical conditions.

SUMMARY OF THE INVENTION

Embodiments of the present invention relate to methods of identifying a speaker based on individually distinctive patterns of voice characteristics. More specifically, embodiments of the present invention pertain to methods of using a reassigned spectrogram of a first spoken utterance during a plurality of phonation cycles of a resonant sound, and comparing it with a reassigned spectrogram of a second spoken utterance during a plurality of phonation cycles of a corresponding resonant sound.

The present invention uses the time-corrected instantaneous frequency (reassigned) spectrogram to image a time-frequency spectrum of a voice sound. A certain kind of reassigned spectrogram of a person's voice, computed with certain parameters in the particular methods described more fully below establish a unique pattern (referred to as a biometric phonation spectrogram) for that individual which may then be used for comparison and identification purposes. Several algorithms already exist for computation of the reassigned spectrogram, and elimination of noise and other distractions has also been accomplished, making it possible to focus purely on certain aspects of the voice sound that are useful for identification purposes.

To obtain a biometric phonation spectrogram for a speaker, a particular kind of pruned reassigned spectrogram is computed for a portion of the sound from 25-50 ms in duration. This small sound slice will generally be drawn from within a typical vowel pronounced by the speaker during ordinary speech, however, any vocal vibration sound may be used. The speaker's vocal cords should generally be vibrating during the selected sound slice—it is this phonation process that is to be captured in the reassigned spectrogram. It has been found by the inventor that the detailed image of a person's phonation process obtained through the methods of the present invention reveals individuating patterns in the time-frequency plane resulting from the unique anatomy and physiology of each person's larynx, vocal cords, and phonation process.

The frequency range from 100-3000 Hz has been found most useful for individuating speakers. A speaker generally has more than one identifying biometric phonation spectrogram, however. This is because each person will usually produce a different phonation spectrum for each different vowel sound. The phonation spectrum will also change gradually as prosodic features such as vocal pitch and overall voice quality are changed.

Two biometric phonation spectrograms obtained from the same speaker saying the same utterance on each occasion will appear to match so long as they are obtained from corresponding vowels within the utterance and the speaker is saying the utterance in approximately the same fashion on each occasion. The degree to which two matching biometric phonation spectrograms are identical is affected by differences in pitch and voice quality between the repetitions. Two biometric phonation spectrograms from different speakers will virtually never appear sufficiently similar to be falsely matched.

In some aspects, the invention concerns a method of comparing a plurality of voice signals that can include: receiving a digital representation of each of the plurality of voice signals; generating at least one reassigned spectrogram corresponding to each of the plurality of digitized voice signals; pruning each of the plurality of reassigned spectrograms to remove noise and computational artifacts; and comparing a first of the plurality of reassigned spectrograms to at least one other of the plurality of reassigned spectrograms, wherein the first of the plurality of reassigned spectrograms corresponds to a voice signal to be validated and the other plurality of reassigned spectrograms correspond to reference voice signals.

In another aspect, the invention concerns a method of comparing two voice sounds to determine whether they came from the same source that can include: recording a first voice signal; selecting a first vocal vibration from the first voice signal; isolating at least two (but preferably four or more) cycles of phonation of the first vocal vibration; computing a first reassigned spectrogram of the first vocal vibration during the isolated phonation cycles; pruning the first reassigned spectrogram to remove unwanted signal elements and artifacts; recording a second voice signal; selecting a second vocal vibration from the second voice signal; isolating cycles of phonation of the second vocal vibration; computing a second reassigned spectrogram of the second vocal vibration during the isolated phonation cycles; pruning the second reassigned spectrogram to remove unwanted signal elements and artifacts; and comparing the first and the second reassigned spectrograms.

In yet another aspect, the invention concerns a method of verifying the identity of a person that can include: generating a first biometric phonation spectrogram, wherein the first biometric phonation spectrogram is the reassigned spectrogram of a first voice sample; generating a second biometric phonation spectrogram, wherein the second biometric phonation spectrogram is the reassigned spectrogram of a second voice sample; and comparing the first and the second biometric phonation spectrograms.

These and other objects, advantages and features of the invention, together with the organization and manner of operation thereof, will become apparent from the following detailed description when taken in conjunction with the accompanying drawings, wherein like elements have like numerals throughout the several drawings described below.

Panel 1 shows an exemplary conventional spectrogram of this speech segment; panel 2 shows an exemplary reassigned spectrogram, and panel 3 shows the reassigned spectrogram of panel 2 after selective pruning of points which do not meet an established second-order phase derivative threshold (or range). The utterance was that of a female recorded with a laptop computer microphone and 44.1 kHz sampling. 4 ms analysis frames were used for these exemplary spectrograms, with frame overlap of 45 microseconds. For panel 3, points from panel 2 were not plotted unless their second-order mixed partial phase derivative was within the ranges of between about −0.25 and about 0.25 (for components) and between about 0.75 and about 1.25 (for impulses).

Figure 1:
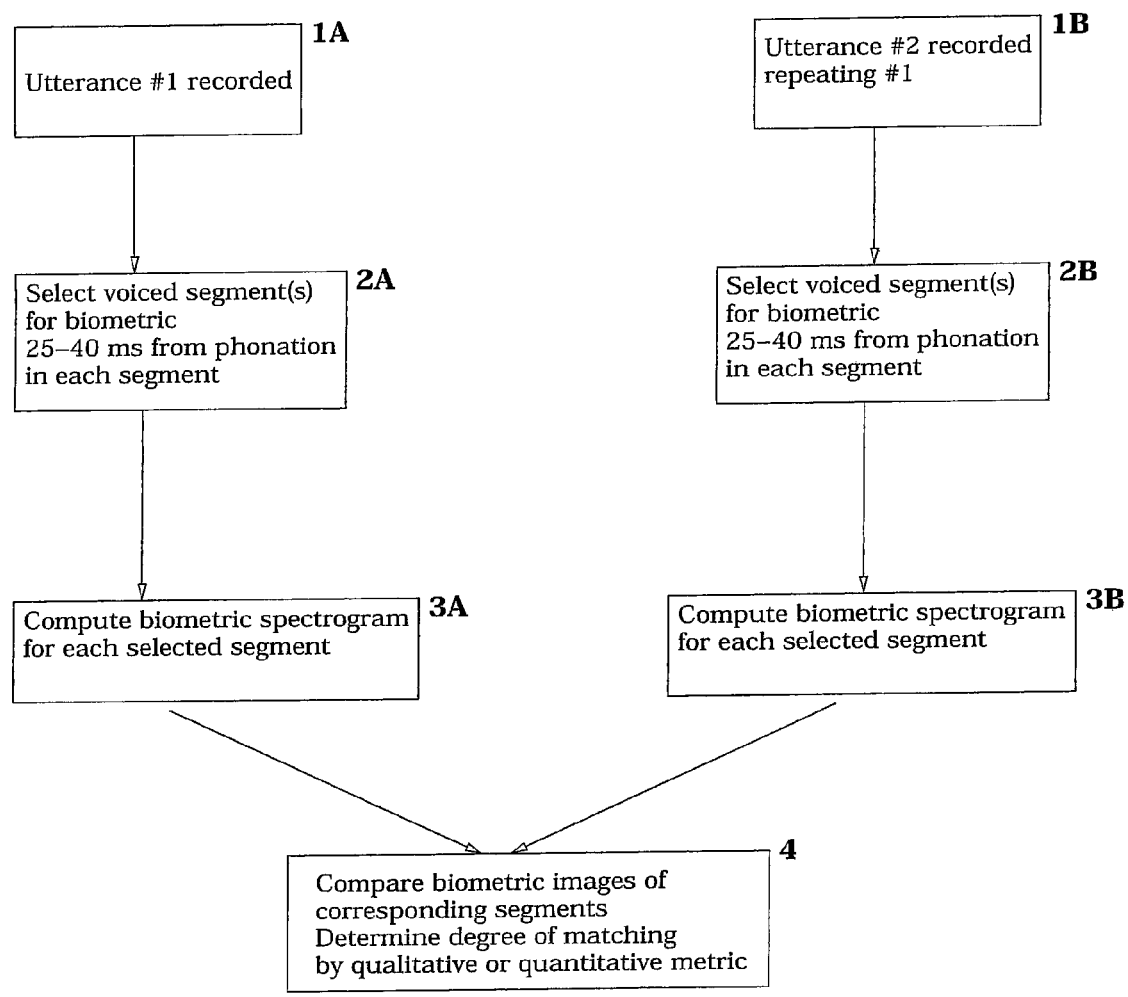
FIG. 1 (flowchart) shows a flowchart of an embodiment of an overall voice comparison procedure of the present invention.
Figure 2:
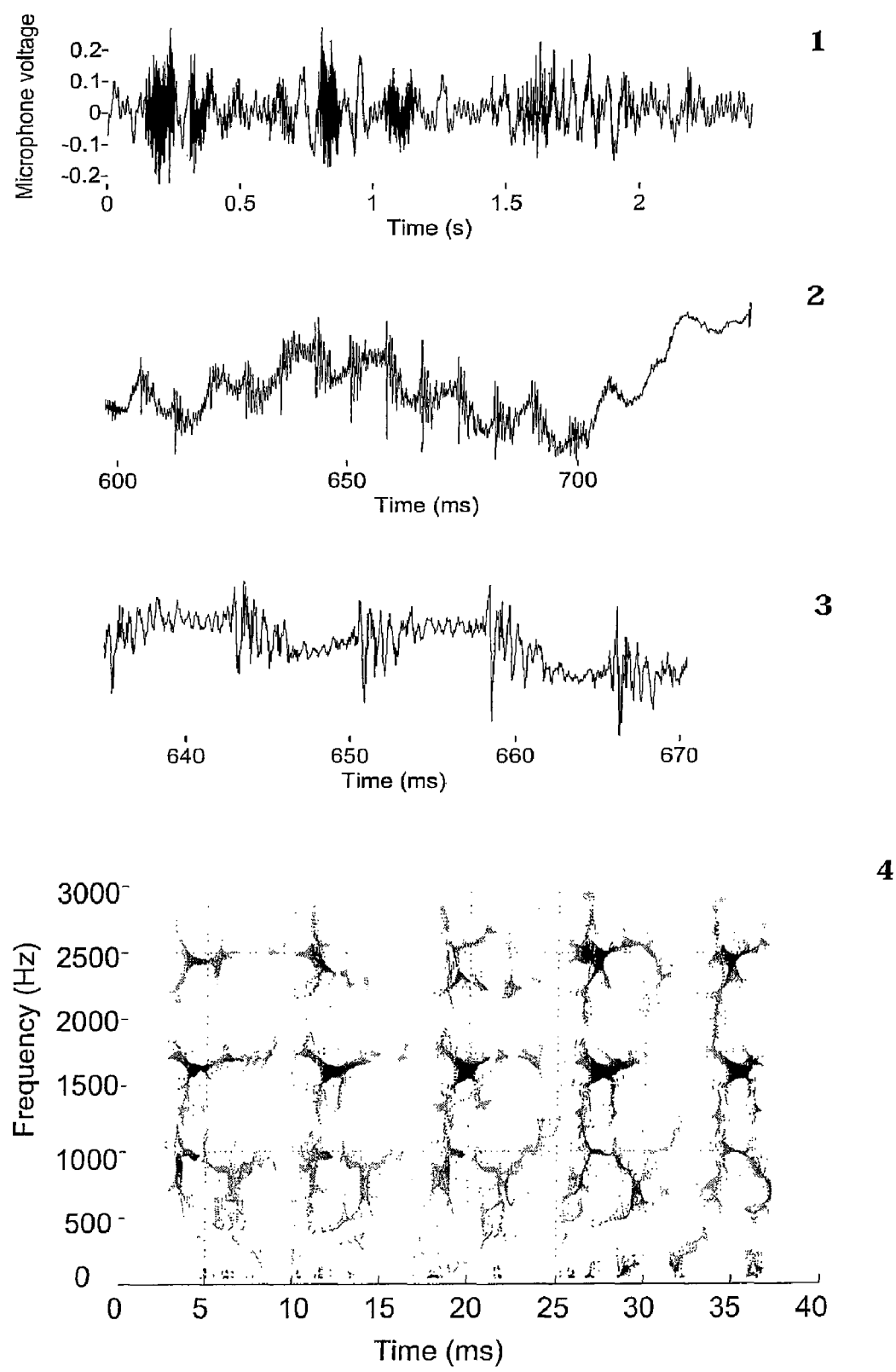
FIG. 2 (selection) illustrates an embodiment of a method for selecting suitable sound portions for the voice biometric from within an utterance. Panel 1 shows an exemplary waveform plot of the speaker stating "secure access, creative thought." This utterance was recorded with a low-fidelity headset microphone using a 44.1 kHz sampling rate. Panel 2 shows the syllable [aek], while panel 3 shows a 39 ms slice from this vowel that is used to create the biometric phonation spectrogram pictured in panel 4. To compute this exemplary reassigned spectrogram, 5 milliseconds (ms) analysis frames were used with a 45 microsecond overlap, and points were not plotted unless their second-order mixed partial phase derivative was within the ranges of between about −0.25 and about 0.25 (for components) and between about 0.75 and about 1.25 (for impulses).
Figure 3:
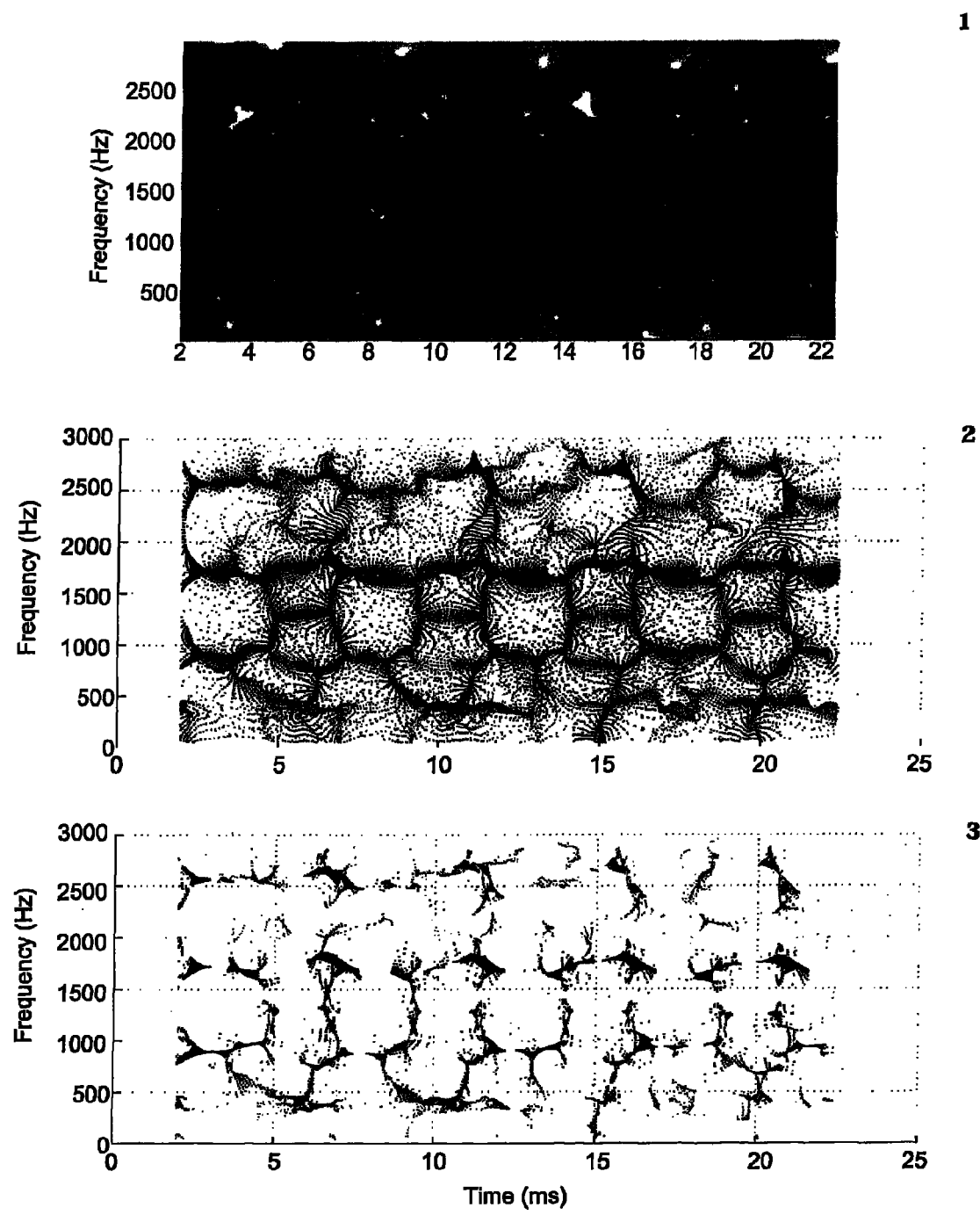
FIG. 3 (spectrograms) compares three different exemplary kinds of spectrogram for the same brief segment of speech. A few vocal cord pulses are shown from the vowel [ae] as it occurs in a natural utterance including the word "access."
Figure 4A:
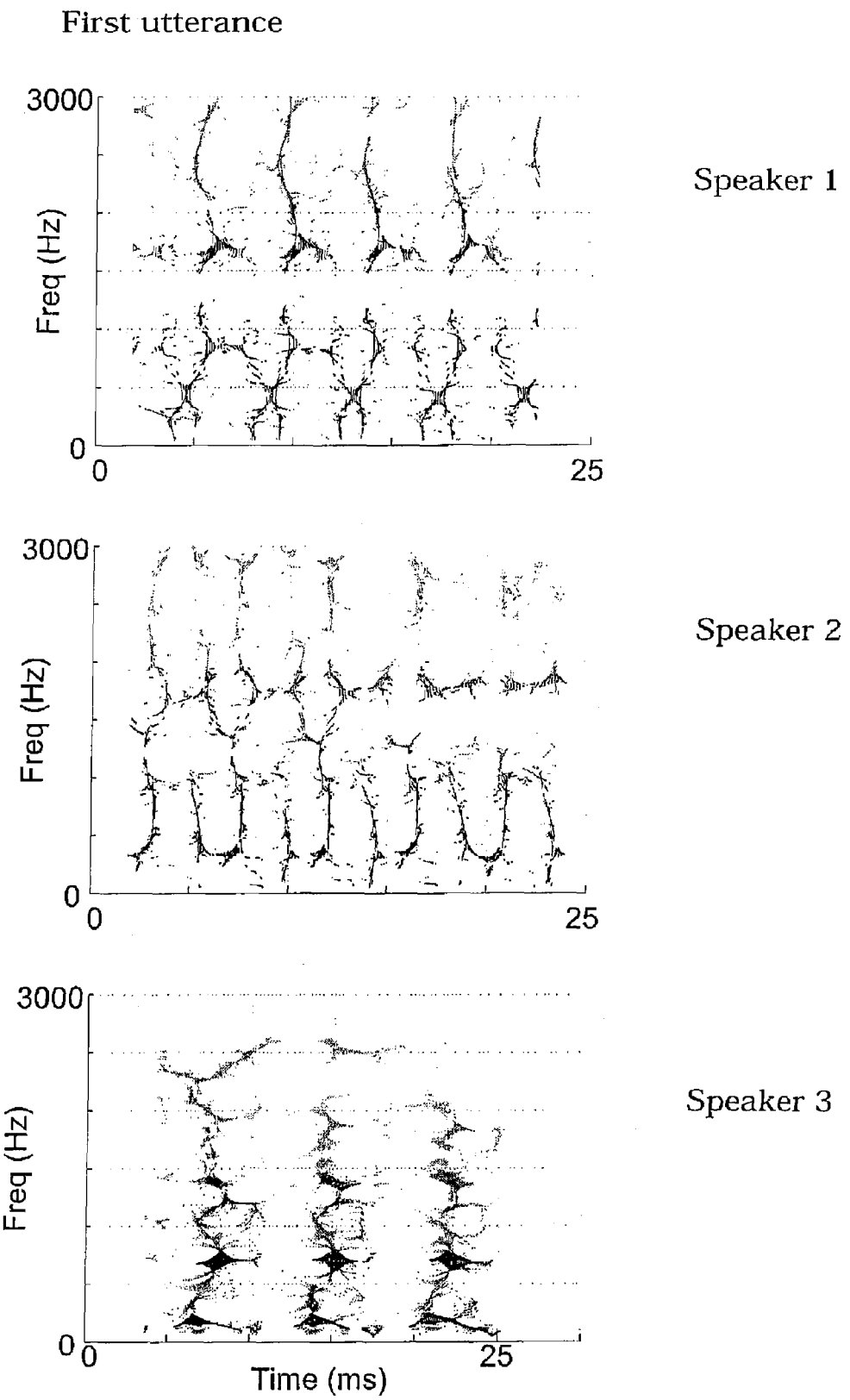
Figure 4B:
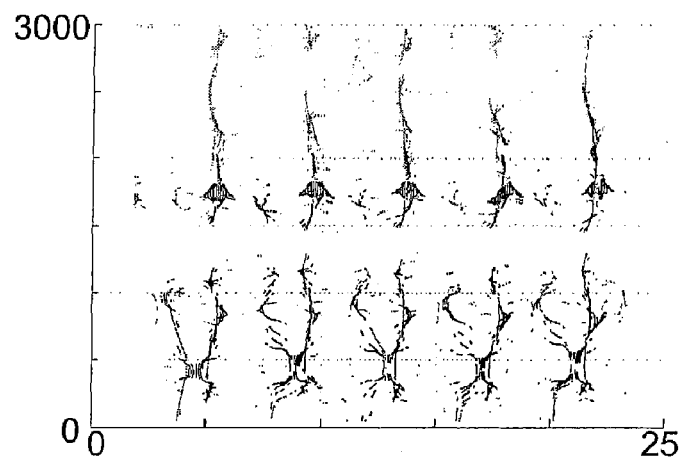
Figure 4B:
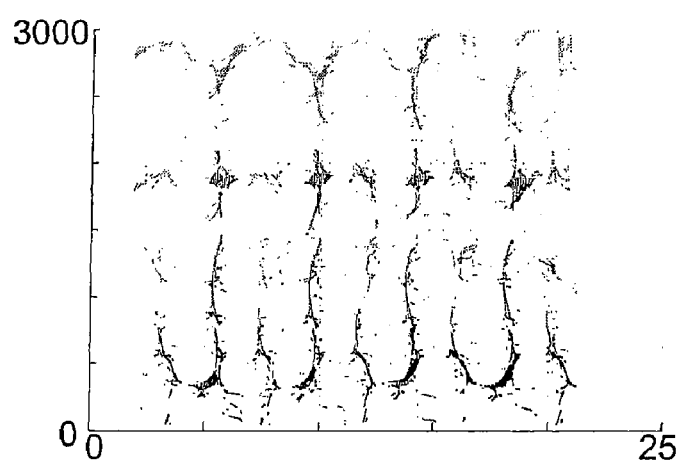
Figure 4B:
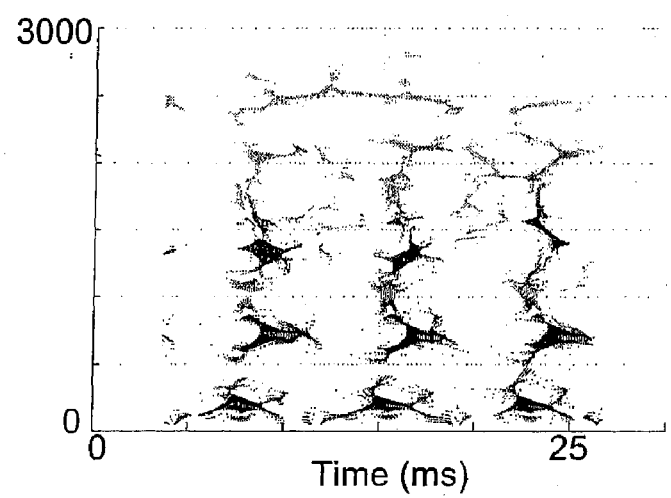

FIGS. 4A & 4B (prints) show examples of matched biometric phonation spectrograms, with two different utterance segments from the same three speakers. Every image in these figures depicts a portion of a Spanish speaker's vowel [a] in "cuando." Analysis frame parameters were optimized for each speaker. To prune the reassigned spectrograms, points were not plotted unless their second-order mixed partial phase derivative was within the range of between −0.25 and 0.25

DETAILED DESCRIPTION

The invention, in its various aspects, will be explained in greater detail below with regard to preferred embodiments. While the invention will be described in conjunction with the preferred embodiments, the preferred embodiments themselves do not limit the scope of the invention. Rather the invention, as defined by the claims, may cover alternatives, modifications, and/or equivalents of the preferred embodiments. Similarly, the accompanying drawings do not limit the scope of the preferred embodiments and/or the invention, but rather, are illustrative of one or more examples of the preferred embodiments and/or invention.

In some embodiments of the methods of the present invention, two phases are contemplated—the first phase involves obtaining and processing a vocal utterance from a speaker and the second phase involves obtaining and processing a second vocal utterance to be matched with the first.

In the first phase, a vocal utterance is obtained from a speaker and then processed. An exemplary embodiment of a first phase can include the following steps: an utterance of the speaker is recorded digitally for use by a computer (such as a ".WAV" file or other suitable sound file); a typical vowel (or other vocal vibration sound with sufficient sonority) within the utterance is selected for analysis; a brief portion of the vocal vibration spanning, for example, approximately 4 cycles of phonation (vocal cord pulsations) is then selected and isolated for the biometric phonation spectrogram; a reassigned spectrogram is then computed using analysis frames having a length in the neighborhood of at least 75% of a single phonation pulse period; the reassigned spectrogram is "pruned"; and the pruned reassigned spectrogram is stored and/or displayed. In some embodiments, the display may be done using any suitable colormap linked to the amplitudes at each time-frequency location.

Although it is not critical which vocal vibration is selected, the selection must be made with the knowledge that a similar procedure will be followed in a second phase in order to obtain a second reassigned spectrogram to be matched to the first. Thus, it is preferred (although not required) that a common vocal vibration be selected, if possible, to improve the opportunity that the same or similar vibration will be available for comparison in the second phase. The duration of this portion will usually lie within a range of about 25-50 ms, but the specific duration depends in large part on the pitch of the voice. For higher pitched voices, a shorter portion will yield a sufficient number of cycles of phonation (e,g., 3-4 cycles); for lower pitched voices, a longer portion may be required to obtain this many cycles. It is to be appreciated that longer or shorter spans (with more or fewer cycles of phonation) are also within the scope of the invention. With respect to the analysis frame length, in some embodiments, all of the phonation period may be used; in other embodiments, only 50-75% of the phonation period may be used. The frequency range shown in the analysis should be from approximately 50 to approximately 3000 Hz. It is to be appreciated that less optimal ranges such as approximately 100 to approximately 1500 Hz may also be used.

Before pruning, the reassigned spectrogram is likely to include stray and distracting features. The post-processing (pruning) step of embodiments of the present invention uses a second-order mixed partial derivative threshold technique, the purpose of which is to eliminate the majority of noise and/or computational artifacts which can distract from good identification. The goal is to obtain a clean individuating image (referred to as a biometric phonation spectrogram) that is relatively free from unnecessary or distracting elements. Different embodiments of the pruning procedure may be used to show different combinations of voice components and impulses. In this context, a "component" or "line component" refers to a quasi-sinusoidal signal element which is possibly amplitude and/or frequency modulated. As used here, an "impulse" refers to a very brief or momentary excitation in the signal, usually visible as an approximately vertical strip in the spectrogram. The mixed partial derivative which is used for the pruning process may defined in two ways; it is both the frequency derivative of the channelized instantaneous frequency (which in turn is the time derivative of the STFT phase that is plotted in a reassigned spectrogram), and also the time derivative of the local group delay (which in turn is the frequency derivative of the STFT phase that is used to plot along the time axis in a reassigned spectrogram). In some embodiments, the threshold value of the mixed partial derivative of the STFT phase may be set to within about 0.25 of 0 which will allow most components to be shown; in other embodiments, setting the threshold value of the same quantity to within 0.5 of 1 will allow most impulses to be shown. The combined plot of all points in the original reassigned spectrogram meeting the selected threshold condition is the pruned reassigned spectrogram.

It has been found that pruning of the spectrogram to show most genuine line components as well as impulses provides a better biometric phonation spectrogram than showing components alone. It has also been found that showing impulses alone is not as useful in this application. In some embodiments, one may thus choose to show, for example, all points whose mixed partial derivative of the phase is in a range of between about −0.25 and about 0.25 (for components), together with all points whose mixed partial derivative is in a range of between about 0.5 and about 1.5 (for impulses). Other settings of the pruning thresholds may also be equally applicable in voice identification, such as in a range of between about 0.75 and about 1.25. Setting the thresholds to be too narrow (e.g. between −0.01 and 0.01) will eliminate too much desirable information from the biometric phonation spectrograms plot.

For improved comparison opportunities, biometric phonation spectrograms may be obtained for more than one different vocal vibration sound from the first utterance using the steps described above. Once the single or multiple biometric phonation spectrogram are obtained, phase one is completed.

In phase two, a second utterance is obtained from a speaker and then processed for comparison to the first. Here, there are at least two options. The preferred option is to record the speaker saying the same utterance as was used for the first biometric phonation spectrogram. However, this may not always be possible. Alternatively, any other utterance having the same syllable as that selected for the first biometric phonation spectrograms will generally be sufficient. What is important is that the same linguistic voiced sound be obtained in both biometric phonation spectrograms, preferably from within the same location of the same word. If multiple biometric phonation spectrograms are obtained from the first utterance, the chances are improved for finding a common voiced sound in the second utterance for comparison purposes. Improved matching may be obtained if the second utterance is spoken with the same voice pitch and quality as the first.

The procedure described above in phase one is then applied to a syllable in the second utterance which is substantially the same as a syllable from which a first biometric phonation spectrogram was made. The second biometric phonation spectrogram should be created using the same parameters provided to the algorithm and pruning methods as were used for the first biometric phonation spectrogram.

In order to establish whether two biometric phonation spectrograms match, a number of possibilities may be exploited. The inventor has discovered that matching biometric phonation spectrograms display highly similar patterns in the time-frequency plane of the reassigned spectrogram. The similarities are particularly strong among the high-amplitude points in the plot (represented in darker shades of gray). The biometric phonation spectrograms of the present invention have only been found to match when they were in fact generated from the speech of the same person. This similarity of the spectrograms prevails even if the same sound is found in a different context, or if the same sound is spoken with a different vocal pitch.

Establishing whether two biometric phonation spectrograms display highly similar patterns (i.e. that they do match) may be performed visually by an expert, but it is preferred that the matching be done computationally using an image-matching algorithm (such as may be employed for fingerprinting or other existing visual pattern-matching procedures like automated reading of handwriting). Generally, only the more pronounced and/or intense components of the images will be used for matching. Less intense components typically correspond to irrelevant and/or quasi-random features that are not a particular indication of the speaker. With some important exceptions (such as the fourth and fifth format frequencies), components above 3000 Hz are generally not helpful for speaker identification.

It is to be appreciated that any voiced sound for which a biometric phonation spectrogram was obtained from the first utterance may be compared to a biometric phonation spectrogram for a similar voiced sound obtained from the second or subsequent utterance. It is also to be appreciated that, where possible, multiple voiced sounds for which biometric phonation spectrograms were obtained from the first utterance may be compared to corresponding biometric phonation spectrograms for similar voiced sounds obtained from the second or subsequent utterances.

It is preferred that speech sounds within utterances that are to be compared for identification purposes be selected both for their suitability to undergo the biometric phonation spectrogramming procedure (not all sounds will work), and for their degree of similarity to each other to effect a good probability of a match being determined. An oversimplified way to describe what is preferred here is to seek "the same vowel" (or "the same voiced sound") in each of the two utterances being compared. However, it is to be appreciated that the methods of the present invention will also work when comparing less similar voiced sounds.

When voice comparison is performed manually (i.e. without an automated routine to select segments of speech for comparison), it is then up to the investigator to select one or more appropriate sound segments which will work well with the voice biometric procedure and which are similar across utterances being compared. A few glottal pulsations need to be selected for a voice biometric image to implement the procedure claimed. This implies that the appropriate speech segment must be voiced, not voiceless. Noise in the signal is not helpful to the procedure, so noisy sounds like voiced fricatives (v, z, etc.) or stops (b, d, etc.) should not be used. Vowels and other resonant sounds such as m, n, l, r are all useful with the procedure, with vowels being the likely best sort of speech segment to rely on. Once a given sound is selected for a biometric phonation spectrogram in one utterance, the (linguistically) same or a very similar sound should be selected for a comparison biometric phonation spectrogram in the second utterance. Under ideal conditions for voice matching, the second utterance would be an exact repetition of the first, and the two biometric phonation spectrograms can be drawn from the same vowel (or other resonant) of the same syllable within the respective repetitions. However, as noted previously, the methods of the present invention will also work when comparing less similar voiced sounds.

It is possible in some embodiments to augment the biometric phonation spectrogramming procedure with a variety of automated schemes for selecting the appropriate segment(s) of speech for the biometric computation and subsequent comparison. There are essentially two steps to this process. First, an appropriate segment of speech must be located in the first utterance. Second, a closely matched segment must be located in the comparison utterance.

The first step can be accomplished by a variety of means known in the art for detecting a segment of voiced speech with a high harmonicity (low noise) and thus a high degree of resonance. Vowels will frequently score best on these sorts of automatic metrics. An example procedure would involve locating a vowel by autocorrelation analysis of the signal and then measuring the harmonicity to ensure that it was above a certain threshold, such as 10 decibels. Another example procedure would involve using a cepstral metric of voicing instead of the autocorrelation analysis, such as requiring the first cepstral peak to have a sufficient amplitude indicative of a voiced sonorant sound (e.g. 1 decibel).

The second step is less simple for an automated system, but a variety of methods can be envisioned which harness speech recognition techniques known in the art. One example involves computing the mel-frequency cepstral coefficients (MFCC feature vector known from speech recognition algorithms) of the selected segment from the first utterance, and then stepping through the second (comparison) utterance frame-by-frame to find the segment with the closest matching MFCC feature vector. This would most likely be a sufficiently similar vowel sound, so the biometric phonation spectrogram comparison procedure may then be fruitfully applied. Other feature vector characterizations of speech segments would be equally applicable to this segment-matching task, such as linear predictive coefficients.

Exemplary Methods of Comparing a Plurality of Voice Signals

In some embodiments, the invention concerns a method of comparing a plurality of voice signals that can include:

receiving a digital representation of each of the plurality of voice signals; generating at least one reassigned spectrogram corresponding to each of the plurality of digitized voice signals; pruning each of the plurality of reassigned spectrograms to remove noise and/or computational artifacts; and comparing a first of the plurality of reassigned spectrograms (for such things as lines or clusters of points having substantially similar shapes) to at least one other of the plurality of reassigned spectrograms, wherein the first of the plurality of reassigned spectrograms corresponds to a voice signal to be validated and the other plurality of reassigned spectrograms correspond to reference voice signals.

In some implementations, the step of generating a reassigned spectrogram can include: identifying a target location within the voice sample; selecting a portion of the voice signal corresponding to the target location; segmenting the selected portion into a group of partially overlapping analysis time frames; obtaining a spectrogram by calculating a transform such as a short-time Fourier Transform calculation on the plurality of analysis time frames; and reassigning the spectrogram by calculating a time derivative and a frequency derivative of the phase argument of the spectrogram. It is to be appreciated that in some of these embodiments, the steps of identifying a target location and selecting a portion of the voice signal may be combined into a singled step. It is also to be appreciated that in these embodiments, transform calculations other than the short-time Fourier transform (STFT) may alternatively be used.

In some implementations, the target location may correspond to a vocal vibration and have a sonority greater than a sonority threshold. For example and without limitation, a target sound may be required to have a high harmonicity (e.g. greater than 10 decibels), which is defined as the energy ratio of the harmonics over the noise in the signal; or the target sound may be required to have a significant first cepstral peak prominence (e.g. a level greater than 1 decibel). In some situations, the target location may correspond to a vowel sound. In other situations, the target location may correspond to the pronunciation of an English letter selected from the group consisting of a, e, i, l, m, n, o, r, and u. It is to be appreciated that embodiments of the invention may be used for languages other than English, such that appropriate voiced sounds from these languages may be used. By way of example, and without limitation, any of the sounds set forth in the table of sounds/IPA characters below, as well as many others, may alternatively be used in the methods of the present invention:

TABLE 1

Sounds/IPA Characters

| Symbol Vowel Sounds | Key Words | IPA Symbol |
|---|---|---|
| a | at, cap, parrot | æ |
| ā | ape, play, sail | ei |
| ä | cot, father, heart | a, α |
| e | ten, wealth, merry | ε |
| ē | even, feet, money | i |
| i | is, stick, mirror | I |
| ī | ice, high, sky | ai |
| ō | go, open, tone | ou |
| ô | all, law, horn | ɔ |
| oo | could, look, pull | ʊ |
| yoo | cure, furious, your | jʊ |
| o͞o | boot, crew, tune | u |
| yo͞o | cute, few, use | ju |
| oi | boy, oil, royal | ɔI |

TABLE 1-continued

Sounds/IPA Characters

| Symbol Vowel Sounds | Key Words | IPA Symbol |
|---|---|---|
| ou | cow, out, sour | au |
| u | mud, ton, blood, trouble | ʌ |
| u | her, sir, word | ɝ |
| ə | ago, agent, collect, focus | ə |
| . | cattle, paddle, sudden, sweeten | l̩, n̩ |

(Charis SIL (c) Copyright 1989-1992, Bitstream Inc., Cambridge, Mass. BITSTREAM CHARTER is a registered trademark of Bitstream Inc.)

In some implementations, the target location can be identified by a human operator.

In alternative implementations, the target location can be identified by a processor. In some implementations, the methods may also include: performing an autocorrelation analysis of the voice sample; determining the harmonicity of a result of the autocorrelation analysis; and selecting the target location having a value greater than a harmonicity threshold. Where signal autocorrelation is very good, the signal may then be identified as periodic and so probably voiced in that region. In some examples, the method may also include: performing a cepstral analysis of the digitized voice sample; determining the harmonicity of a result of the cepstral analysis; and selecting the target location having a first cepstral peak prominence above a threshold such as 1 decibel.

In some implementations, the length of the selected portion can correspond to preferably at least four phonation cycles of the target location. For example, the length of the selected portion may correspond to between about 25 and about 50 milliseconds, or between about 25 and about 40 milliseconds. It is to be appreciated that the length of the selected portion could involve a single phonation cycle, although this is not optimal. In other implementations, the length of each analysis time frame may be between about 5 and about 30 percent of the length of the selected portion. For example, the length of the analysis time frame can be between about 4 and about 7 milliseconds.

In other implementations, the step of pruning the reassigned spectrogram may include eliminating data points when the mixed partial derivative of the phase lies outside the range of at least one threshold condition. For example, one of the threshold conditions can be between about −0.25 and about 0.25. In another example, a threshold condition can be between about 0.5 and about 1.5. In another example, a threshold condition can be between about 0.75 and about 1.25. In another example, a threshold condition can be between about −0.25 and about 1.25. In another example, a threshold condition can be between about −0.25 and about 1.5. In another example, a pair of threshold conditions may be used, one between about −0.25 and about 0.25, and the other between about 0.75 and about 1.25. In another example, a pair of threshold conditions may be used, one between about −0.25 and about 0.25, and the other between about 0.5 and about 1.5. In another example, a pair of threshold conditions may be used, one between about −0.25 and about 0.25, and the other between about 0.75 and about 1.5. In another example, a pair of threshold conditions may be used, one between about −0.25 and about 0.25, and the other between about 0.5 and about 1.25. It is to be appreciated that other similar threshold conditions, or pairs of conditions, may also be used.

In other implementations, the frequency range of the reassigned spectrogram can be between about 50 and 3000 Hz.

In some implementations, the step of comparing the reassigned spectrograms can include: generating a colormap corresponding to each of the reassigned spectrograms; displaying the plurality of colormaps; visually comparing the most pronounced and intense areas of the first reassigned spectrogram to the most pronounced and intense areas of the other reassigned spectrograms; and selecting which of the other reassigned spectrograms most closely correlates to the first reassigned spectrogram.

In alternative implementations, the step of comparing the reassigned spectrograms can include: selecting data points in each of the reassigned spectrograms exceeding a threshold value; calculating the Euclidean squared distances between the selected data points in the first reassigned spectrogram and the selected data points in the other reassigned spectrograms, and selecting which of the other reassigned spectrograms has the least total distance to the first reassigned spectrogram. In some of these implementations, the step of comparing said reassigned spectrograms may involve processing each of the spectrograms through a statistical pattern-identification device, and then selecting one of the reassigned spectrograms that is best matched to the first spectrogram according to output from the device. Such a device may be a support vector machine.

In other alternative implementations, the step of comparing the reassigned spectrograms may utilize any appropriate statistical comparison, or the use of any of the Gaussian mixture model (GMM) comparison procedures.

Exemplary Methods of Comparing Two Voice Sounds

In other embodiments, the invention concerns a method of comparing two voice sounds to determine whether they came from the same source which can include: recording a first voice signal; selecting a first vocal vibration from the first voice signal; isolating a plurality of cycles of phonation of the first vocal vibration; computing a first reassigned spectrogram of the first vocal vibration during the isolated phonation cycles; pruning the first reassigned spectrogram to remove unwanted signal elements and artifacts; recording a second voice signal; selecting a second vocal vibration from the second voice signal; isolating a plurality of cycles of phonation of the second vocal vibration; computing a second reassigned spectrogram of the second vocal vibration during the isolated phonation cycles; pruning the second reassigned spectrogram to remove unwanted signal elements and artifacts; and comparing the first and the second reassigned spectrograms.

In some implementations, the first and the second reassigned spectrograms can be computed for a range of between about 50 and 3000 Hz.

In some implementations, the method may also include dividing the at least four cycles of phonation into between about 3 to 20 time frames.

In some implementations, the step of selecting the first vocal vibration can include performing an autocorrelation analysis of the first voice signal and selecting a time during which the autocorrelation exceeds a threshold.

In some implementations, the step of selecting the first vocal vibration can include performing a cepstral analysis of the first voice signal and selecting a time during which the harmonicity of the cepstral analysis exceeds a harmonicity threshold. In some implementations, the step of selecting the second vocal vibration may include comparing the mel-frequency cepstral coefficients of the first vocal vibration to the second voice signal, wherein the second vocal vibration corresponds to the time at which the mel-frequency cepstral coefficients match the most.

In some implementations, the step of pruning may include: computing the mixed partial derivative of the phase of the reassigned spectrogram; and eliminating data where the mixed partial derivative exceeds one or more thresholds. For example, the threshold can be between about −0.25 and 0.25. In another example, the threshold can be between about 0.5 and 1.5. In another example, a threshold condition can be between about 0.75 and about 1.25. In another example, a threshold condition can be between about −0.25 and about 1.25. In another example, a threshold condition can be between about −0.25 and about 1.5. In another example, a pair of threshold conditions may be used, one between about −0.25 and about 0.25, and the other between about 0.75 and about 1.25. In another example, a pair of threshold conditions may be used, one between about −0.25 and about 0.25, and the other between about 0.5 and about 1.5. In another example, a pair of threshold conditions may be used, one between about −0.25 and about 0.25, and the other between about 0.75 and about 1.5. In another example, a pair of threshold conditions may be used, one between about −0.25 and about 0.25, and the other between about 0.5 and about 1.25. It is to be appreciated that other similar threshold conditions, or pairs of conditions, may also be used.

Exemplary Methods of Verifying the Identity of a Person

In some implementations, the invention concerns a method of verifying the identity of a person, which can include: generating a first biometric phonation spectrogram, wherein the first biometric phonation spectrogram is the reassigned spectrogram of a first voice sample; generating a second biometric phonation spectrogram, wherein the second biometric phonation spectrogram is the reassigned spectrogram of a second voice sample; and comparing the first and the second biometric phonation spectrograms.

In some implementations, the method may also include pruning the first and the second biometric phonation spectrograms by removing data wherein the mixed partial derivative of the phase exceeds one or more threshold values.

In another implementation, the step of comparing the biometric phonation spectrograms may include displaying the biometric phonation spectrograms on a colormap.

It is to be understood that variations and/or modifications of the present invention may be made without departing from the scope of thereof. It is also to be understood that the present invention is not to be limited by the specific embodiments, descriptions or illustrations or combinations of either components or steps disclosed herein.

What is claimed is:

1. A method of comparing voice signals, comprising:
   a. receiving a digital representation of each of a plurality of voice signals;
   b. generating at least one reassigned spectrogram corresponding to each of said plurality of digital representations;
   c. pruning each of said plurality of reassigned spectrograms to remove noise and computational artifacts, wherein said pruning comprises computing a mixed partial derivative of the phase of said spectrogram and removing data points from said spectrogram when said derivative is outside of a range;
   d. comparing a first of said plurality of reassigned spectrograms to at least one other of said plurality of reassigned spectrograms, wherein said first reassigned spectrogram corresponds to a voice signal to be validated; and e. identifying any similarities between said first spectrogram and any of said remaining spectrograms.

2. The method of claim 1, wherein the step of generating a reassigned spectrogram comprises:
   a. identifying a target location within said digital representation;
   b. selecting a portion of said digital representation within said target location;
   c. sectioning said selected portion into a plurality of partially overlapping analysis time frames;
   d. obtaining a spectrogram by calculating a short-time Fourier Transform calculation over the plurality of said analysis time frames; and
   e. reassigning the spectrogram by calculating a time derivative and a frequency derivative of a phase argument of the spectrogram.

3. The method of claim 2, wherein said target location corresponds to a vocal vibration and has a sonority greater than a sonority threshold.

4. The method of claim 2, wherein said target location corresponds to a vowel sound.

5. The method of claim 2, wherein said target location corresponds to a letter selected from the group consisting of a, e, i, l, m, n, o, r, and u.

6. The method of claim 2, wherein said target location corresponds to any sound represented by an IPA character.

7. The method of claim 2, wherein said target location is identified by a human operator.

8. The method of claim 2, wherein said target location is identified by a processor.

9. The method of claim 8, wherein said step of identifying a target location comprises:
   a. performing an autocorrelation analysis of said digital representation;
   b. limiting potential target locations to those having a value greater than a threshold.

10. The method of claim 8, wherein said step of identifying a target location comprises limiting potential target locations to those having a harmonics-to-noise ratio of greater than about 10 decibels.

11. The method of claim 8, wherein said step of identifying a target location comprises:
    a. performing a cepstral analysis of said digital representation;
    b. determining a harmonicity; and
    c. limiting potential target locations to those having a value greater than a cepstral threshold.

12. The method of claim 2, wherein said selected portion includes at least four phonation cycles.

13. The method of claim 12, wherein each analysis time frame has a length that is between about 5 percent and about 30 percent of the length of said selected portion.

14. The method of claim 12 wherein the length of each analysis time frame is at least about 75% of a phonation cycle.

15. The method of claim 12 wherein each analysis time frame overlaps an adjacent analysis time frame by at least about 50%.

16. The method of claim 2, wherein said selected portion includes at least one phonation cycle.

17. The method of claim 2, wherein the length of said selected portion is between about 25 and about 50 milliseconds.

18. The method of claim 17, wherein the length of each analysis time frame is between about 4 and about 7 milliseconds.

19. The method of claim 2, wherein the length of said selected portion is approximately 40 milliseconds.

20. The method of claim 2 wherein each analysis time frame is customized using pitch-synchronous analysis to determine phonation cycle time.

21. The method of claim 1, wherein the step of generating a reassigned spectrogram comprises:
    a. identifying a target location within said digital representation;
    b. selecting a portion of said digital representation within said target location;
    c. sectioning said selected portion into a plurality of analysis time frames;
    d. obtaining a spectrogram by generating a magnitude plot transform; and
    e. reassigning the spectrogram by calculating a time derivative and a frequency derivative of the phase argument of the spectrogram.

22. The method of claim 1 wherein said cepstral threshold has a high amplitude peak.

23. The method of claim 22 wherein said cepstral threshold peak is at least 1 decibel.

24. The method of claim 1, wherein said range is between about −0.25 and about 0.25.

25. The method of claim 1, wherein said range is between about 0.5 and about 1.5.

26. The method of claim 1, wherein said a first range is between about −0.25 and about 0.25, and a second range is between about 0.75 and about 1.25.

27. The method of claim 1, wherein said range is between about −0.25 and about 1.5.

28. The method of claim 1, wherein said range is between about −0.25 and about 1.25.

29. The method of claim 1, wherein said range is between about 0.75 and about 1.25.

30. The method of claim 1, wherein the frequency range of said reassigned spectrogram is between about 50 and 3000 Hz.

31. The method of claim 1, wherein the frequency range of said reassigned spectrogram is between about 100 and 1500 Hz.

32. The method of claim 1, wherein said step of comparing said reassigned spectrograms comprises:
    a. generating a colormap corresponding to each of said reassigned spectrograms;
    b. displaying said plurality of colormaps;
    c. visually comparing the most pronounced and intense areas of said first reassigned spectrogram to the most pronounced and intense areas of said other reassigned spectrograms; and
    d. selecting at least one of said other reassigned spectrograms that most closely correlates to said first reassigned spectrogram.

33. The method of claim 1, wherein said step of comparing said reassigned spectrograms comprises:
    a. generating outputs corresponding to each of said reassigned spectrograms;
    b. comparing the most pronounced and intense areas of the output for said first reassigned spectrogram to the most pronounced and intense areas of the outputs for said other reassigned spectrograms; and
    c. selecting at least one of said outputs that most closely correlates to said first output.

34. The method of claim 1, wherein said step of comparing said reassigned spectrograms comprises:
    a. selecting data points in each of said reassigned spectrograms exceeding a threshold value;

b. calculating the Euclidean squared distances between said selected data points in said first reassigned spectrogram and said selected data points in said other reassigned spectrograms, and c. selecting at least one of said other reassigned spectrograms having the least total distance to said first reassigned spectrogram.

35. The method of claim 1, wherein said step of comparing said reassigned spectrograms comprises:
   a. processing each of said spectrograms through a statistical pattern-identification device;
   b. selecting one of said other reassigned spectrograms that is best matched to the first spectrogram according to the device.

36. The method of claim 35, wherein said device is a support vector machine.

37. The method of claim 1, wherein said step of comparing said reassigned spectrograms utilizes a Gaussian mixture model comparison procedure.

38. The method of claim 1 wherein the step of comparing said reassigned spectrograms comprises:
   a. generating images for each of said reassigned spectrograms;
   b. comparing sets of points and lines in the image for said first reassigned spectrogram for similarity to sets of points and lines in the images for said other reassigned spectrograms; and
   c. selecting one of said other reassigned spectrograms that most closely correlates to said first reassigned spectrogram.

39. A method of comparing two voice sounds to determine whether they came from the same source, comprising:
   a. recording a first voice signal;
   b. selecting a first vocal vibration from said first voice signal;
   c. isolating at least four cycles of phonation of said first vocal vibration;
   d. computing a first reassigned spectrogram of said first vocal vibration for said isolated phonation cycles;
   e. pruning said first reassigned spectrogram to remove unwanted elements by computing a mixed partial derivative of the phase of said first reassigned spectrogram and removing data points from said first reassigned spectrogram when said derivative is outside of a range;
   f. recording a second voice signal;
   g. selecting a second vocal vibration from said second voice signal;
   h. isolating at least four cycles of phonation of said second vocal vibration;
   i. computing a second reassigned spectrogram of said second vocal vibration for said isolated phonation cycles;
   j. pruning said second reassigned spectrogram to remove unwanted signal elements by computing a mixed partial derivative of the phase of said second reassigned spectrogram and removing data points from said second reassigned spectrogram when said derivative is outside of a range; and
   k. comparing said first and said second reassigned spectrograms.

40. The method of claim 39, wherein said first and said second reassigned spectrograms are computed for a range of between about 50 and 3000 Hz.

41. The method of claim 39, further comprising sectioning said at least four cycles of phonation into between about 3 and about 20 partially overlapping time frames.

42. The method of claim 39, wherein said step of selecting said first vocal vibration comprises performing an autocorrelation analysis of said first voice signal and selecting a time during which the autocorrelation exceeds a threshold indicative of a periodic signal.

43. The method of claim 39, wherein said step of selecting said first vocal vibration comprises performing a cepstral analysis of said first voice signal and selecting a time during which the first peak amplitude of said cepstral analysis exceeds a threshold.

44. The method of claim 43, wherein said step of selecting said second vocal vibration comprises comparing the mel-frequency cepstral coefficients of said first vocal vibration to said second voice signal, wherein said second vocal vibration corresponds to the time at which said mel-frequency cepstral coefficients match the most.

45. The method of claim 39, wherein said range is between about −0.25 and about 0.25.

46. The method of claim 39, wherein said range is between about 0.5 and about 1.5

47. The method of claim 39, wherein a first range is between about −0.25 and about 0.25, and a second range is between about 0.5 and about 1.5.

48. The method of claim 39, wherein a first range is between about −0.25 and about 0.25, and a second range is between about 0.75 and about 1.25.

49. The method of claim 39, wherein said range is between about −0.25 and about 1.5.

50. The method of claim 39, wherein said range is between about −0.25 and about 1.25.

51. A method of verifying the identity of a person, comprising:
   a. generating a first reassigned spectrogram of a selected portion of a first voice sample;
   b. generating a second reassigned spectrogram of a selected portion of a second voice sample;
   c. pruning unwanted elements from both of said spectrograms by computing mixed partial derivatives of the phases of each of said spectrograms and removing data points from said spectrogram when said derivatives are outside of a range; and
   d. comparing said first and said second pruned reassigned spectrograms.

52. The method of claim 51, wherein a first range is between about −0.25 and about 0.25, and a second range is between about 0.75 and about 1.25.

53. The method of claim 51, wherein said step of comparing said voiceprints comprises displaying said voiceprints on a colormap.

* * * * *